United States Patent

[11] 3,591,301

| [72] | Inventor | Alfred Kaser<br>Austrasse 15, Rieden, Nussbaumen,<br>Switzerland |
|---|---|---|
| [21] | Appl. No. | 735,775 |
| [22] | Filed | June 10, 1968 |
| [45] | Patented | July 6, 1971 |
| [32] | Priority | June 16, 1967 |
| [33] | | Switzerland |
| [31] | | 8705/67 |

[54] DRILLING DEVICE, PARTICULARLY FOR GUN AND ANNULAR DRILLING
2 Claims, 1 Drawing Fig.

[52] U.S. Cl. ................................................ 408/56,
408/125, 408/126
[51] Int. Cl. .................................................. B23b 47/00,
B23b 47/28
[50] Field of Search .......................................... 77/55, 55
G, 62 B

[56] References Cited
UNITED STATES PATENTS
3,049,031  8/1962  Carstens ....................... 77/62
3,120,767  2/1964  Kleine ........................... 77/62
3,320,832  5/1967  Jensen .......................... 77/55

FOREIGN PATENTS
236,597  12/1961  Australia ....................... 77/55

Primary Examiner—Francis S. Husar
Attorney—Pierce, Scheffler & Parker

ABSTRACT: A drilling device features a drill bushing for guiding the drill to prevent lateral movement of the drill during the initial drilling stage. A fluid-actuated piston to which the bushing is secured serves to apply a force to the latter to anchor it firmly on the surface of the workpiece, and the lower end face of the bushing in contact with the workpiece is provided with an integral sealing ring to prevent escape of any of the fluid used for drill cooling, lubricating and flushing. The lower end face of the bushing is provided with a milling cutter to cut a groove into the workpiece until contact is made with the sealing ring, and the piston-bushing structure is driven in rotation by means of a gear drive.

PATENTED JUL 6 1971　　　3,591,301
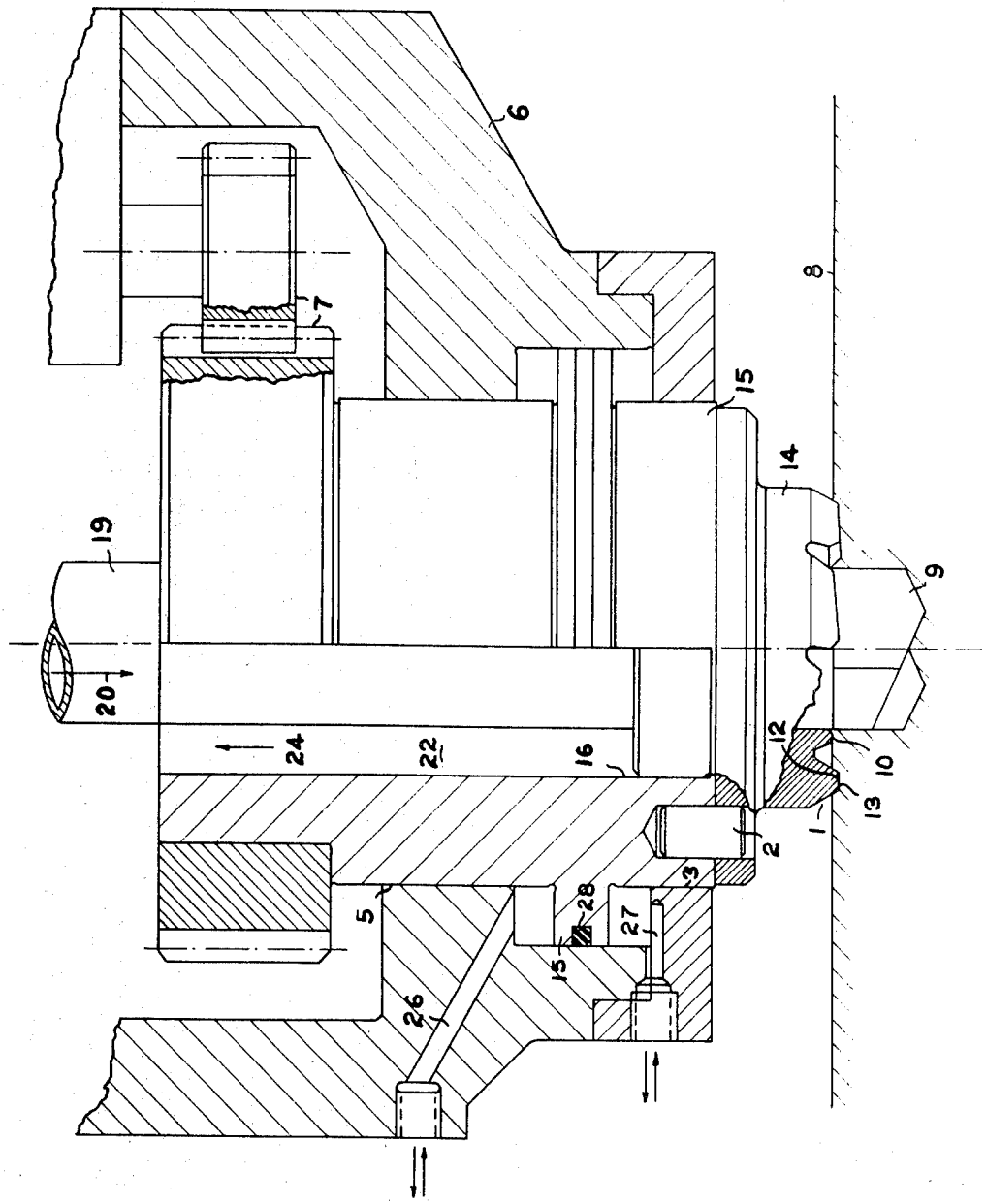
INVENTOR.
Alfred Kaser
BY
Pierce, Scheffler & Parker
Attorneys

DRILLING DEVICE, PARTICULARLY FOR GUN AND ANNULAR DRILLING

The invention relates to a drilling device, particularly for gun and annular drilling, with a drill to which pressurized oil for cooling, lubrication, and flushing purposes is supplied and having a bushing for guiding the drill which is pressed on to the workpiece that has to be drilled so as to establish firm contact with the workpiece and withstand the radial forces which occur during penetration and drilling and thus prevent any radial movement of the drill.

Until quite recently it was impossible to use hard metal gun drills on radial boring machines, horizontal boring mills, milling machines, lathes, and the like, because no drill bushing supports were available which could withstand the radial forces which occur when penetrating the surface of the workpiece. As a result of the instability of the bushing support, the hard metal cutter is destroyed when establishing penetration contact so that an economical application of hard metal drills for gun and annular drilling is impossible.

A boring device for gun drilling is known having an axially moveable bushing which surrounds the drill and is provided at its end with a sharp edge which is pressed with considerable force into the workpiece that has to be drilled. In this way the drill bushing can absorb the rotating radial force produced by the gun drill and at the same time prevent an escape of the pressurized oil which serves for lubrication, cooling, and flushing away the chips. The large pressure required to drive the bushing edge into the workpiece surface with a plastic deformation, limits the application of this device to gun drills with a diameter of 30 mm., maximum 40 mm. Beyond this size, the necessary pressure cannot be produced in conventional machines and even new constructions cannot be designed for such pressures for economic reasons. Thus also the use of annular drills in this known drilling device is out of the question, because they are only efficient with diameters, exceeding those already mentioned.

The object of the present invention is to fix the drill bushing to the workpiece in such a manner that it can withstand the radial forces occuring in the drill, particularly when penetrating the workpiece surface. Moreover, care must be taken that the pressurized oil cannot escape due to any leaks. In accordance with the invention this is achieved by providing the bushing with a milling cutter on its lower face and arranging the bushing for simultaneous rotation about its axis while it is pressed downwardly against the face of the workpiece so that a circular groove is cut into the face which thereby serves to anchor the drill bushing to the workpiece. A sealing ring arranged concentrically with the drill bushing and within the milling cutter comes into contact with the face of the workpiece after the circular groove has been milled in.

A constructional example of the device according to the invention will now be explained by means of the accompanying drawing which shows in sectional view along a meridian plane with some parts in elevation a gun-drilling device when applied to a workpiece with an unmachined or only roughly machined surface.

The drawing illustrates a section of a drilling device with a hard metal gun drill 9 for drilling a workpiece 8. This drill 9 is fixed to a drill tube 19 which is connected in a known manner to a drive. The hard metal gun drill 9 is held by a guide or bushing 14 which closely surrounds it so that the radial forces which occur during drilling can be supported by the bushing 14. The lower extremity 1 of the bushing 14 is constructed in the form of a milling cutter 12 which is visible in FIG. 1. The extremity 1 with its milling cutter 12 serves to produce a groove 13 in workpiece 8. That part of the bushing extremity 1 which is nearer to the axis is constructed in the form of a integral sealing ring 10. The end face of the milling cutter 12 extends beyond i.e. lower than the end face of sealing ring 10 so that the latter contacts the workpiece only after the milling cutter has cut a groove. Drill bushing 14 is connected to a pressure piston 15 by means of bolts which are not shown, the transmission of the torque between piston 15 and drill bushing 14 during the milling operation being assured by means of driving pins 2. Pressure piston 15 and drill bushing 14 are caused to rotate by means of gears 7 which are actuated by a drive which is not shown. Piston 15 is provided with a central bore 16 for centering bushing 14. Piston 15 which is provided with a seal 28 is supported in bearings 5 and 3 in casing 6. Casing 6 is also provided with two pressure oil bores 26 and 27 which lead to the cylinder chamber at both sides of pressure piston 15.

During drilling, oil flows in the direction indicated by arrow 20 to the hard metal gun drill 9 and from there along the chip grooves of drill 9 to the annular chamber 22 between drill tube 19 and the centering inner wall of pressure piston 15, in the direction of arrow 24, whereby the drilling chips are flushed away. As the drill 9 penetrates into the workpiece a corresponding annular ring channel or groove is produced between the wall of the workpiece and the drill tube.

The drilling process is performed as follows:

After the drilling device is brought into the desired position, for instance by means of digital control, pressure oil is supplied by way of bore 26 to pressure piston 15 until the lower extremity 1 of the drill bushing has reached the surface of the workpiece. Thereupon, whilst the oil pressure is still maintained on the pressure piston 15 drill bushing 14 is caused to rotate by way of gearing 7, so that the cutter 12 mills out a groove 13 in workpiece 8. As soon as sealing ring 10 makes contact with the surface of the workpiece, the frictional resistance of drill bushing 14 increases. When a predetermined torque is attained the driving motor is stopped, for instance by means of a thermal switch, and then the pressure exerted by drill bushing 14 on workpiece 8 is increased. As soon as this pressure reaches a predetermined value, the driving motor for drill 9 is put into operation and the drilling operation commences.

Due to the fact that drill bushing 14 is held in groove 13, lateral movement of drill 9 and any vibrations of the latter are prevented. As a result of bushing 14 being held in groove 13, radial forces which occur, particularly when commencing the drilling operation and which can be high in the case of large bore diameters, can be withstood and an exact guiding of the drill is obtained. The connection between drill bushing 14 and workpiece 8 is both nonpositive and of the clamping type. The clamping connection is maintained by a suitable choice of the forces produced by the pressure oil within the elastic range of deformation.

Fundamentally, it is possible to use a solid drill 9 instead of an annular or core drill.

I claim:

1. In a drilling device, particularly for gun and annular drilling, the combination comprising a drill bushing for guiding the drill which extends through the bushing, said drill being provided with pressurized oil for cooling, lubrication and flushing purposes, means supporting said bushing for rotation about its axis and movement longitudinally of said axis to engage and press against the workpiece, the lower end face of said bushing being provided with a milling cutter concentric with the bushing bore and a sealing ring located adjacent the bushing bore and being surrounded by said milling cutter, said milling cutter projecting below the plane of said sealing ring, and means for rotating said bushing about its axis operable in conjunction with means for pressing the lower end of said bushing against the workpiece thereby causing said milling cutter to cut a circular groove in the face of the workpiece until said sealing ring engages the face of the workpiece, said circular groove serving to seat the bushing in the workpiece during the ensuing drilling operation and prevent any lateral displacement thereof.

2. A drilling device as defined in claim 1 wherein said means for pressing said bushing against the workpiece includes a casing provided with a cylinder and a fluid actuated piston operable within said cylinder, said bushing being secured to said piston, and wherein said means for rotating said bushing about its axis includes drive gearing means including a gear surrounding and secured to said piston.